United States Patent
Fueller et al.

(10) Patent No.: US 9,188,448 B2
(45) Date of Patent: Nov. 17, 2015

(54) METHODS AND SYSTEMS FOR DETERMINING AN ANCHORING LOCATION OF A MARINE VESSEL

(71) Applicant: The Boeing Company, Seal Beach, CA (US)

(72) Inventors: Merien Fueller, Hamburg (DE); Andre Lutz, Hessen (DE); Marco Franz Gärtner, Hessen (DE); Andreas Godehart, Hessen (DE)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 13/683,846

(22) Filed: Nov. 21, 2012

(65) Prior Publication Data

US 2014/0142845 A1    May 22, 2014

(51) Int. Cl.
*G01C 21/20* (2006.01)
*G08G 1/123* (2006.01)
*G08G 3/00* (2006.01)
*G05D 1/00* (2006.01)

(52) U.S. Cl.
CPC . *G01C 21/20* (2013.01); *G08G 3/00* (2013.01)

(58) Field of Classification Search
CPC ....... G05D 1/02; G05D 1/0208; G01C 21/30; G01C 21/005; G01C 21/20; G06F 17/30283; G08G 3/00
USPC .................................... 701/461, 21, 409, 484
See application file for complete search history.

(56) References Cited

U.S. PATENT DOCUMENTS

| | | | | |
|---|---|---|---|---|
| 4,301,760 A | * | 11/1981 | Cassone et al. | 114/144 B |
| 4,335,520 A | | 6/1982 | Wilson | |
| 4,755,947 A | * | 7/1988 | Braschler et al. | 701/116 |
| 5,386,368 A | * | 1/1995 | Knight | 701/116 |
| 5,386,792 A | * | 2/1995 | Richardson | 114/246 |
| 5,491,636 A | * | 2/1996 | Robertson et al. | 701/116 |
| 5,731,788 A | * | 3/1998 | Reeds | 342/357.57 |
| 6,353,813 B1 | * | 3/2002 | Breese et al. | 706/12 |
| 6,799,528 B1 | * | 10/2004 | Bekker | 114/151 |

(Continued)

FOREIGN PATENT DOCUMENTS

JP    2005140549 A    *    6/2005

OTHER PUBLICATIONS

European Search Report in European Application No. EP 13 18 9075 issued Sep. 11, 2014, 5 pages.

*Primary Examiner* — Fadey Jabr
*Assistant Examiner* — Angelina Shudy
(74) *Attorney, Agent, or Firm* — Armstrong Teasdale LLP (57) ABSTRACT

A system for determining an anchoring location of a marine vessel. The system includes a first computing device configured to capture location data of the marine vessel along a route of the marine vessel, and a second computing device. The second computing device including a memory area, a location component that determines location data of a marine vessel, and a processor. The processor is programmed to receive, from the first computing device, the location data of the marine vessel, determine, from the location data, a location along a route of the marine vessel that the marine vessel traveled a distance less than a maximum threshold distance over a predefined period of time, and identify the location along the route of the marine vessel that the marine vessel traveled a distance less than the anchoring threshold distance over the predefined period of time as an anchoring location.

22 Claims, 5 Drawing Sheets

(56) References Cited

U.S. PATENT DOCUMENTS

| | | |
|---|---|---|
| 7,143,712 B1 | 12/2006 | Naslund |
| 8,296,001 B1* | 10/2012 | Kabel et al. ............... 701/21 |
| 8,335,642 B2* | 12/2012 | Wipplinger et al. ......... 701/409 |
| 8,549,044 B2* | 10/2013 | Danado et al. ............... 707/802 |
| 2002/0069210 A1* | 6/2002 | Navani et al. ............ 707/104.1 |
| 2003/0128138 A1 | 7/2003 | Grunder |
| 2003/0191562 A1* | 10/2003 | Robertson et al. ............ 701/21 |
| 2007/0073454 A1* | 3/2007 | Kaji et al. ..................... 701/21 |
| 2007/0138347 A1* | 6/2007 | Ehlers ......................... 246/1 R |
| 2008/0079608 A1* | 4/2008 | Morrell ........................ 340/984 |
| 2008/0147257 A1* | 6/2008 | Kuhlgatz et al. .............. 701/21 |
| 2008/0243372 A1* | 10/2008 | Bodin et al. ................. 701/206 |
| 2009/0084302 A1 | 4/2009 | Daran et al. |
| 2009/0105952 A1* | 4/2009 | Grace et al. .................. 701/300 |
| 2009/0177394 A1* | 7/2009 | Walz et al. .................... 701/213 |
| 2009/0276148 A1* | 11/2009 | Arvidsson .................... 701/116 |
| 2010/0023262 A1* | 1/2010 | Haney ........................... 701/213 |
| 2010/0068955 A1* | 3/2010 | Wiggin et al. .................... 441/7 |
| 2010/0070118 A1* | 3/2010 | Yamada et al. ................. 701/21 |
| 2011/0066646 A1* | 3/2011 | Danado et al. ................ 707/770 |
| 2011/0131050 A1* | 6/2011 | Zimmer et al. ............... 705/1.1 |
| 2011/0281478 A1* | 11/2011 | Blumenthal ..................... 440/6 |
| 2012/0072102 A1* | 3/2012 | Grace et al. .................. 701/300 |
| 2013/0019790 A1* | 1/2013 | Flint et al. .................. 114/144 B |
| 2013/0269583 A1* | 10/2013 | Miller .......................... 114/263 |
| 2014/0129128 A1* | 5/2014 | Haran .......................... 701/300 |
| 2014/0142845 A1* | 5/2014 | Fueller et al. ................. 701/461 |
| 2014/0340241 A1* | 11/2014 | Smart, Jr. ................... 340/932.2 |
| 2015/0134558 A1* | 5/2015 | Murray ......................... 705/333 |

\* cited by examiner

METHODS AND SYSTEMS FOR DETERMINING AN ANCHORING LOCATION OF A MARINE VESSEL

BACKGROUND

The present disclosure relates generally to determining an anchoring of a marine vessel, and more specifically, to a system and method for determining an anchoring location of a marine vessel based on location data of the marine vessel.

Finding an anchoring berth is not supported by current technology. Lack of knowledge on this subject at best can make some situations frustrating and difficult, and at worse cause one to lose a boat or even a life. Many factors must be considered when determining where to anchor a boat, such as: shelter from wind, boat traffic, "swinging room" availability, a depth of water, and a terrain of the sea floor. However, even with current technology, finding a proper location to anchor a boat can be an extremely difficult and time consuming task, especially in areas a mariner is not familiar with.

SUMMARY

In one aspect, a system for detecting an anchoring location of a marine vessel is provided. The system includes a first computing device configured to capture location data of the marine vessel along a route of the marine vessel, and a second computing device. The second computing device including a memory area, a location component that determines location data of a marine vessel, and a processor. The processor is programmed to receive, from the first computing device, the location data of the marine vessel, determine, from the location data, a location along a route of the marine vessel that the marine vessel traveled a distance less than a maximum threshold distance over a predefined period of time, and identify the location along the route of the marine vessel that the marine vessel traveled a distance less than the anchoring threshold distance over the predefined period of time as an anchoring location.

In another aspect, a computing device for determining an anchoring location of a marine vessel is provided. The computing device includes a memory area, a location component that determines location data of the marine vessel; and a processor. The processor is programmed to receive the location data of the marine vessel, determine, from the location data, a location along a route of the marine vessel that the marine vessel traveled a distance less than a maximum threshold distance over a predefined period of time, and identify the location along the route of the marine vessel that the marine vessel traveled a distance less than the anchoring threshold distance over the predefined period of time as an anchoring location.

In yet another aspect, a method for determining an anchoring location of a marine vessel is provided. The method includes receiving location data of the marine vessel, determining, from the location data, a location along a route of the marine vessel that the marine vessel traveled a distance less than a maximum threshold distance over a predefined period of time, and identifying the location along the route of the marine vessel that the marine vessel traveled a distance less than the anchoring threshold distance over the predefined period of time as an anchoring location.

BRIEF DESCRIPTION OF THE DRAWINGS

The present disclosure is described in detail below with reference to the attached drawing figures.

DETAILED DESCRIPTION

A Global Positioning System (GPS) can be used by a mariner to identify a current location of a marine vessel (e.g., a boat or a ship). This GPS position information can be used for supporting other systems to identify a location of other marine vessels (AIS—Automatic Identification System), a route to a particular location (Chartplotter), ocean terrain (Chartplotter), and/or current weather conditions/forecasts for the location. GPS tracking systems may also be used to record a route a marine vessel has taken as well as record a time the marine vessel has spent at various locations along the route. However, even with the information provided by current technology, if a mariner does not have previous experience anchoring in a particular location or does not have documentation showing ideal anchoring locations, finding a proper location to anchor a marine vessel can be an extremely difficult and time consuming task. Further, unless a mariner chooses to document/identify various locations along the route the marine vessel has anchored, these anchoring locations are not captured in the record/tracking of the route.

The present disclosure enables an anchoring location of a marine vessel to be automatically determined from location data within the recorded/tracked route information associated with a marine vessel. However, one of ordinary skill in the art guided by the teachings herein will appreciate that while embodiments of the disclosure are illustrated and described herein with reference to using information captured by a GPS tracking system to determine an anchoring location of a marine vessel, aspects of the disclosure are operable with any system that performs the functionality illustrated and described herein, or its equivalent.

An exemplary technical effect of the methods and systems described herein includes at least one of (a) receiving location data associated with a marine vessel; (b) determining, from the location data, a location along a route of the marine vessel that the marine vessel traveled a distance less than a maximum threshold distance over a predefined period of time; and (c) identifying the location along the route of the marine vessel that the marine vessel traveled a distance less than the anchoring threshold distance over the predefined period of time as an anchoring location.

Figure 1:
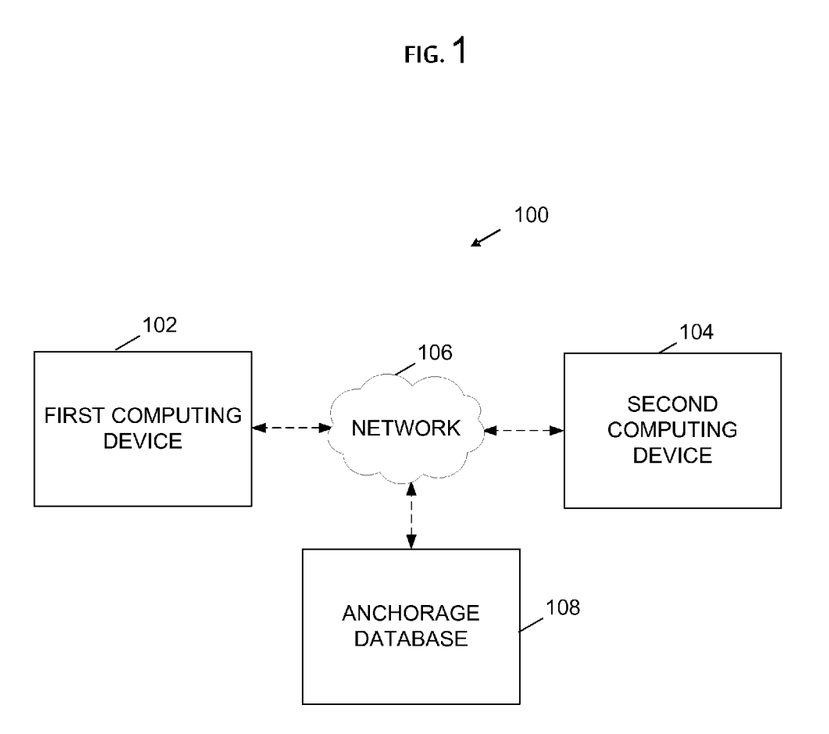
FIG. 1 is a block diagram of an exemplary system for use in determining an anchoring location of a marine vessel.

With reference now to FIG. 1, an exemplary block diagram of a system 100 for determining an anchoring location of a marine vessel is provided. Embodiments of the disclosure enable a mobile communication device with navigation functionality, such as a first computing device 102, to record location data for a route of, for example, a marine vessel. In some embodiments, first computing device 102 is a mobile communication device with GPS capabilities for gathering the location data. In some embodiments, first computing device 102 stores the location data in memory (not shown), which can later be accessed by a second computing device 104. In other embodiments, second computing device 104 can access the location data from first computing device 102 in real time, for example, via a network 106. In one embodiment, system 100 also includes an anchorage database 108 that stores anchorage locations. As such, marine vessels can search anchorage database 108 for anchorage locations in a particular area, for example, a current location of a marine vessel or a particular location along a route the marine vessel.

While embodiments of the disclosure are illustrated and described herein with reference to a computing device or mobile computing device such as a laptop, embedded device, telephone, or a personal digital assistant, aspects of the disclosure are operable with any computing device that performs the functionality illustrated and described herein, or its equivalent. For example, embodiments of the disclosure are operable with a desktop computing device, a laptop computer, and other portable and non-portable computing devices capable of providing navigation functionality.

Figure 2:
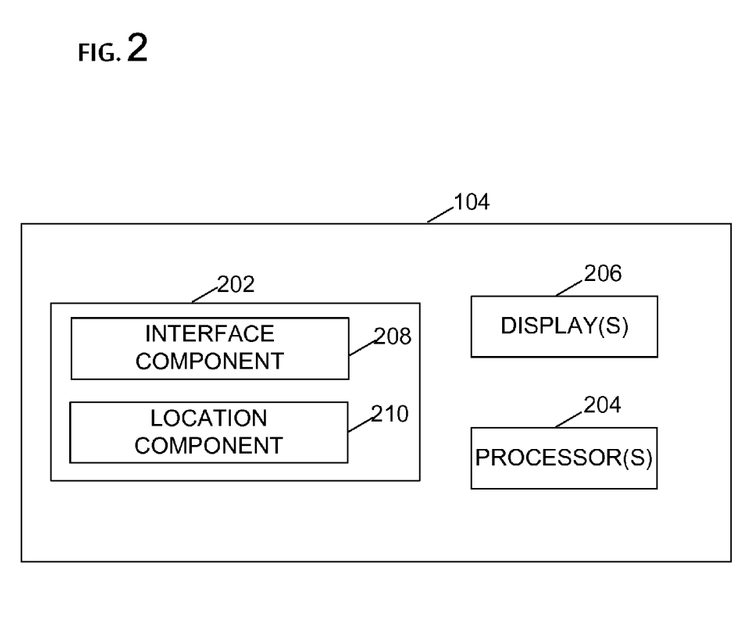
FIG. 2 is an exemplary block diagram of a computing device having a memory area storing components for determining an anchoring location of a marine vessel.

Referring now to FIG. 2, second computing device 104 includes a memory area 202, at least one processor 204, and one or more optional displays 206 for displaying navigation information to a user. Although processor 204 is shown separate from memory area 202, embodiments of the disclosure contemplate that memory area 202 may be onboard processor 204, such as in some embedded systems. The diagram of FIG. 2 is merely illustrative of an exemplary computing device that can be used in connection with one or more embodiments of the disclosure, and is not intended to be limiting in any way.

Memory area 202, or other computer-readable media, stores computer-executable components for determining and identifying anchoring locations of marine vessels. Exemplary components include, but are not limited to, an interface component 208 and a location component 210. Memory area 202 further stores location data such as location information associated with a route as well as a time spent at various locations along the route. For example, the location information may include location coordinates for each location along a route of a marine vessel. As such, a detailed and accurate path of a marine vessel along a route can be stored in memory area 202.

In one embodiment, computer-executable instructions for determining an anchor location of a marine vessel may be stored and executed from a memory area remote from second computing device 104. For example, instructions may be stored in a cloud service, a database, or other memory area accessible by second computing device 104. Such embodiments reduce the computational and storage burden on second computing device 104.

Referring again to FIG. 2, interface component 208 receives, from first computing device 102, via a connection such as network 106, location data associated with the marine vessel. In embodiments, location component 210 determines location data of the marine vessel upon receipt of the location data from first computing device 102, which can either be accessed in real time or anytime thereafter.

In one embodiment, processor 204 is transformed into a special purpose microprocessor by executing computer-executable instructions or by otherwise being programmed. For example, processor 204 is programmed with instructions such as is illustrated in and next described in FIG. 3.

Figure 3:
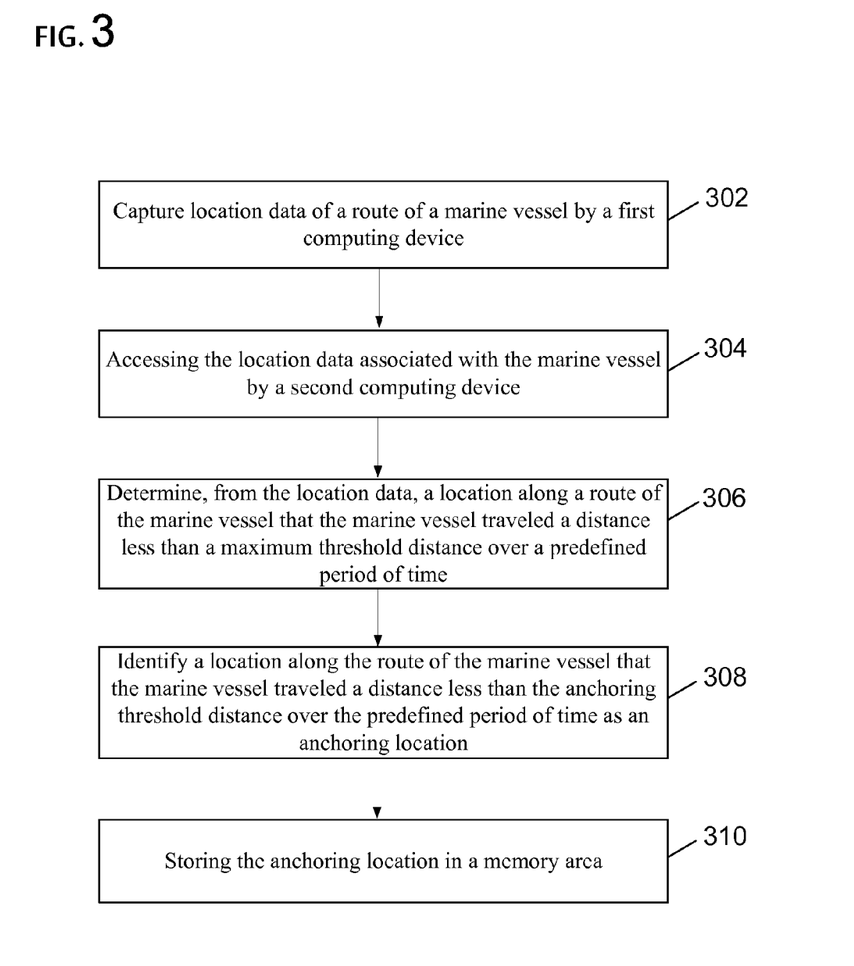
FIG. 3 is an exemplary flow chart illustrating a process for determining an anchoring location of a marine vessel.

With reference now to FIG. 3, an exemplary flow chart illustrates a method for determining an anchoring location of a marine vessel. Initially, at 302, location data of a route of a marine vessel is captured by a first computing device (e.g., first computing device 102). In one embodiment, first computing device 102 includes navigation functionality to record location data for a route of the marine vessel during a route of the marine vessel and storing the location data in a memory (not shown) of first computing device 102.

At 304, the location data associated with the marine vessel is accessed by a second computing device (e.g., second computing device 104). Second computing device 104 may access the location data from first computing device 102 in real time, or anytime thereafter, for example, via a network 106. At 306, second computing device 104, and more specifically, location component 210 determines, from the location data, a location along a route of the marine vessel that the marine vessel traveled a distance less than a maximum threshold distance over a predefined period of time.

Figure 4:
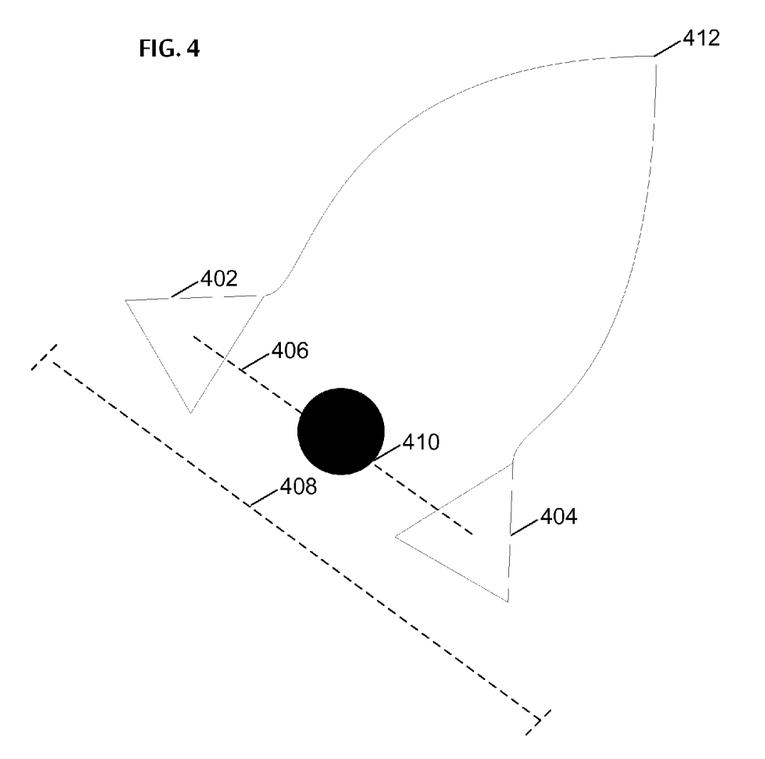
FIGS. 4 and 5 are illustrative examples of possible anchoring locations determined by the systems and methods described herein.

For example, with reference now to FIG. 4, a first location identified in the location data of the marine vessel is shown at 402 and a second location identified in the location data of the marine vessel is shown at 404. Further, at 406, the location data provides a length 406 between first location 402 and the second location 404. As shown in FIG. 4, length 406 between first location 402 and second location 404 is less than a maximum threshold distance 408. While maximum threshold distance 408 described herein is representative of a maximum distance a marine vessel travels when the marine vessel is anchored, maximum threshold distance 408 may be a predefined distance, or a distance that is based on, for example, a type/size of the marine vessel associated with the location data, a length of an anchor line for the marine vessel, a depth of the ocean at anchor point 412, the wind, and/or a combination thereof. Thus, maximum threshold distance 408 may be static or dynamic.

As explained above, location component 210 not only determines, from the location data, a location along a route of the marine vessel that the marine vessel traveled a distance less than a maximum threshold distance, location component 210 also determines, from the location data, whether the marine vessel traveled a distance less than a maximum threshold distance over a predefined period of time. For example, a marine vessel may be anchored for a variety of reasons/activities, such as, for swimming, scuba diving, fishing, and/or an overnight stay. However, each of these activities typically have different anchoring times with respect to how long each activity takes as well as a time of day for each activity. Thus, embodiments of the present disclosure enable an anchoring of the marine vessel to be determined based in part on a defined length of time the marine vessel is within the maximum threshold distance, and the defined length of time may be a length of time representative of a short term anchoring (e.g., anchoring for swimming), or a long term anchoring (e.g., an overnight stay). In addition, the defined length of time may be within a particular time of the day/night. For example, to identify an anchoring representative of an overnight stay, location component 210 may only identify possible anchoring locations that a marine vessel travels a distance less than a maximum threshold distance between sunset and sunrise (e.g., from dawn to dusk).

With reference back to FIG. 3, at 308, a location along the route of the marine vessel that the marine vessel traveled a distance less than the anchoring threshold distance over the predefined period of time is identified as an anchoring location (e.g., location 410 in FIG. 4). In one embodiment, the anchoring location is the average distance between first location 402 and second location 404 of the marine vessel. In another embodiment, determining where the anchoring location is identified between first location 402 and second location 404 of the marine vessel is based on weather conditions (e.g., wind and waves) during a particular time period being analyzed, a length of the anchor line, depth of anchor point 412, and/or a type/size of the marine vessel. However, once the anchoring location is determined, at 310, the anchoring location is stored in memory area 202.

Figure 5:
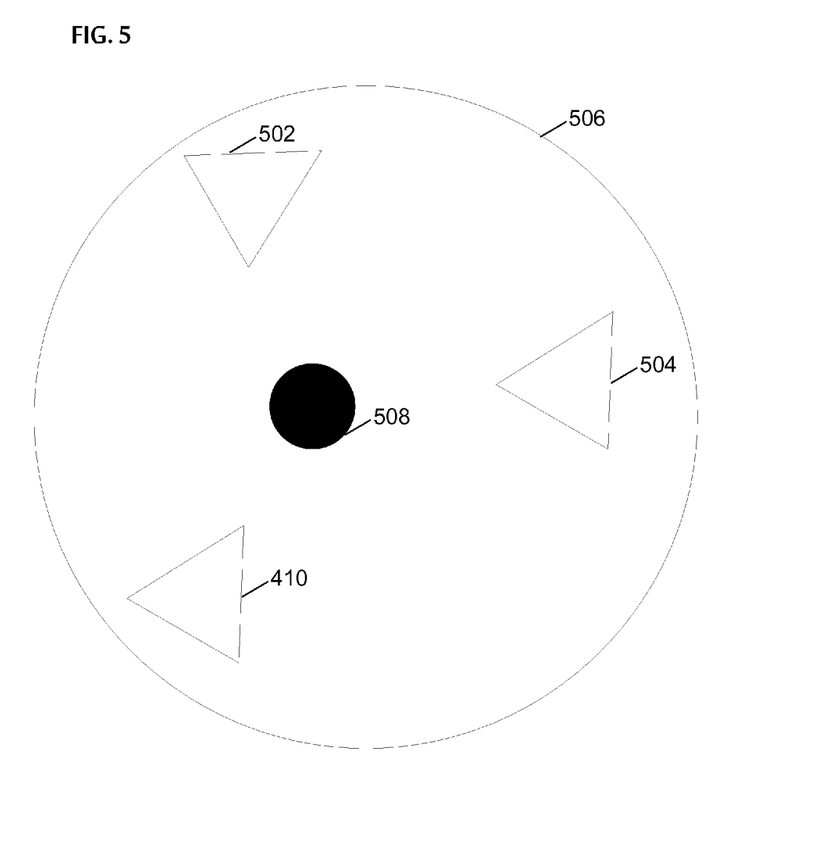

With reference now to FIG. 5, an illustrative example of a particular area having a plurality of determined anchoring locations is provided. That is, a particular area may include pre-existing anchoring locations (e.g., anchoring locations 410, 502, and 504) stored in memory area 202. In one embodiment, once a defined maximum number of anchoring locations are within a defined minimum radius 506 from one another, location component 210 may consolidate the anchoring locations within the minimum distance into an average anchorage location 508, and thereafter, memory area 202 is updated to show average anchorage location 508.

In one embodiment, a marine vessel can access anchorage database 108 to search/identify anchorage locations in a particular area. As such, marine vessels can search the anchorage database 108 for anchorage locations in a particular area, for example, a current location of a marine vessel or a particular location along a route the marine vessel. In one embodiment, a marine vessel provides anchorage database 108 with a current location of the marine vessel. Thereafter, anchorage database 108 provides the marine vessel with one or more stored anchorage locations based on the current location of the marine vessel. In another embodiment, a user searches anchorage database 108 for anchorage locations along a route of the marine vessel. In further embodiments, a user receives updates from anchorage database 108 based on new anchorage locations determined by, for example, second computing device 104. As such, as anchorage database 108 is updated in real-time, the real-time updates are also provided to marine vessels/users based on, for example, a current location of the marine vessel or a route of the marine vessel.

Exemplary Operating Environment

A computer or mobile device such as described herein has one or more processors or processing units, system memory, and some form of computer readable media. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. Communication media typically embody computer readable instructions, data structures, program modules, or other data in a modulated data signal such as a carrier wave or other transport mechanism and include any information delivery media. Combinations of any of the above are also included within the scope of computer readable media.

The mobile device may operate in a networked environment using logical connections to one or more remote computers, such as a remote computer. Although described in connection with an exemplary computing system environment, embodiments of the disclosure are operational with numerous other general purpose or special purpose computing system environments or configurations. The computing system environment is not intended to suggest any limitation as to the scope of use or functionality of any aspect of the disclosure. Moreover, the computing system environment should not be interpreted as having any dependency or requirement relating to any one or combination of components illustrated in the exemplary operating environment. Examples of well known computing systems, environments, and/or configurations that may be suitable for use with aspects of the disclosure include, but are not limited to, personal computers, server computers, hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

Embodiments of the disclosure may be described in the general context of computer-executable instructions, such as program modules, executed by one or more computers or other devices. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other embodiments of the disclosure may include different computer-executable instructions or components having more or less functionality than illustrated and described herein. Aspects of the disclosure may also be practiced in distributed computing environments where tasks are performed by remote processing devices that are linked through a communications network. In a distributed computing environment, program modules may be located in both local and remote computer storage media including memory storage devices.

The order of execution or performance of the operations in embodiments of the disclosure illustrated and described herein is not essential, unless otherwise specified. That is, the operations may be performed in any order, unless otherwise specified, and embodiments of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the embodiments thereof, the articles "a," "an," "the," and "said" are intended to mean that there are one or more of the elements. The terms "comprising," "including," and "having" are intended to be inclusive and mean that there may be additional elements other than the listed elements.

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A system for determining an anchoring location of a marine vessel, the system comprising:
   an anchorage database configured to store anchorage locations;
   a first computing device configured to capture location data of the marine vessel along a route of the marine vessel; and
   a second computing device comprising:
   a memory area;
   a location component that determines location data of the marine vessel; and
   a processor programmed to:
   receive, from the first computing device, the location data of the marine vessel, wherein the location data identifies that the marine vessel has maintained a location between a first location and a second location over a predefined period of time and does not identify the anchoring location of the marine vessel;

determine, from the location data, that a distance between the first location and the second location is less than a maximum threshold distance;

based on the determination that the marine vessel traveled a distance less than the maximum threshold distance over a predefined period of time, determine that the marine vessel is anchored; and based on the determination that the marine vessel is anchored, identify an area between the first location and the second location as the anchoring location, wherein the anchoring location is a location not identified as one of one or more anchoring locations within the anchoring database or by the second computing device prior to determining that the marine vessel is anchored.

2. The system in accordance with claim 1, wherein the first computing device includes a global positioning system (GPS) device.

3. The system in accordance with claim 1, wherein the location data comprises location coordinates of the marine vessel.

4. The system in accordance with claim 1, wherein the memory area comprises a length of an anchor line on the marine vessel; and wherein the length of the anchor line is a factor in determining a length of the maximum threshold distance.

5. The system in accordance with claim 1, wherein the memory area comprises an identification of the marine vessel; and wherein the identification of the marine vessel is a factor in determining a length of the maximum threshold distance.

6. The system in accordance with claim 1, wherein the anchoring location is within a predefined distance from an additional anchoring location; and wherein the processor is further programmed to determine an average anchorage location based on a distance between the anchorage location and the additional anchorage location.

7. The system in accordance with claim 1, wherein the processor is further programmed to provide, from the anchorage database, one or more anchorage locations within the defined radius of a particular location.

8. The system in accordance with claim 7, wherein the particular location is a current location of the second marine vessel.

9. The system in accordance with claim 1, wherein the maximum threshold distance is based on one or more of the following: a length of an anchor line for the marine vessel, a water depth between the first location and the second location, and a type of vessel the marine vessel is.

10. A computing device for determining an anchoring location of a marine vessel; the computing device comprising:

an anchorage database configured to store anchorage locations;

a memory area;

a location component that determines location data of the marine vessel; and a processor programmed to:

receive the location data of the marine vessel, wherein the location data identifies that the marine vessel has maintained a location between a first location and a second location over a predefined period of time and does not identify the anchoring location of the marine vessel;

determine, from the location data, that a distance between the first location and the second location is less than a maximum threshold distance;

based on the determination that the marine vessel traveled a distance less than the maximum threshold distance over a predefined period of time, determine that the marine vessel is anchored; and based on the determination that the marine vessel is anchored, identify an area between the first location and the second location as the anchoring location, wherein the anchoring location is a location not identified as one of one or more anchoring locations within the anchoring database prior to determining that the marine vessel is anchored.

11. The computing device in accordance with claim 10, wherein the marine vessel comprises a communication device configured to provide the location data of the marine vessel along the route of the marine vessel.

12. The computing device in accordance with claim 11, wherein the communication device includes a global positioning system (GPS) device.

13. The computing device in accordance with claim 10, wherein the location data comprises location coordinates of the marine vessel.

14. The computing device in accordance with claim 10, wherein the memory area comprises an identification of the marine vessel; and wherein the identification of the marine vessel is a factor in determining a length of the maximum threshold distance.

15. The computing device in accordance with claim 10, wherein the anchoring location is within a predefined distance from an additional anchoring location; and wherein the processor is further programmed to determine an average anchorage location based on a distance between the anchorage location and the additional anchorage location.

16. A method for determining an anchoring location of a marine vessel, the method comprising:

receiving location data associated with the marine vessel, wherein the location data identifies that the marine vessel has maintained a location between a first location and a second location over a predefined period of time and does not identify the anchoring location of the marine vessel;

determining, by a processor, from the location data, that a distance between the first location and the second location is less than a maximum threshold distance;

based on the determination that the marine vessel traveled a distance less than the maximum threshold distance over a predefined period of time, determining that the marine vessel is anchored; and based on the determination that the marine vessel is anchored, identifying an area between the first location and the second location as the anchoring location, wherein the anchoring location is a location not identified as one of one or more anchoring locations within an anchoring database coupled to the processor prior to determining that the marine vessel is anchored.

17. The method in accordance with claim 16, wherein the location data is received from a computing device on the marine vessel.

18. The method in accordance with claim 17, wherein the computing device is a global positioning system (GPS) device.

19. The method in accordance with claim 16, wherein the location data comprises location coordinates of the marine vessel.

20. The method in accordance with claim 16, further comprising using an identification of the marine vessel as a factor in determining a length of the maximum threshold distance.

21. The method in accordance with claim 16, wherein the anchoring location is within a predefined distance from an additional anchoring location, and wherein the method further comprises determining an average anchorage location based on a distance between the anchorage location and the additional anchorage location.

22. The method in accordance with claim 16, further comprising:

storing the anchoring location in the anchorage database.

* * * * *